Sept. 20, 1932.    F. MESTRE    1,878,594
JEWELER'S EYELOUPE HOLDER
Original Filed May 21, 1930
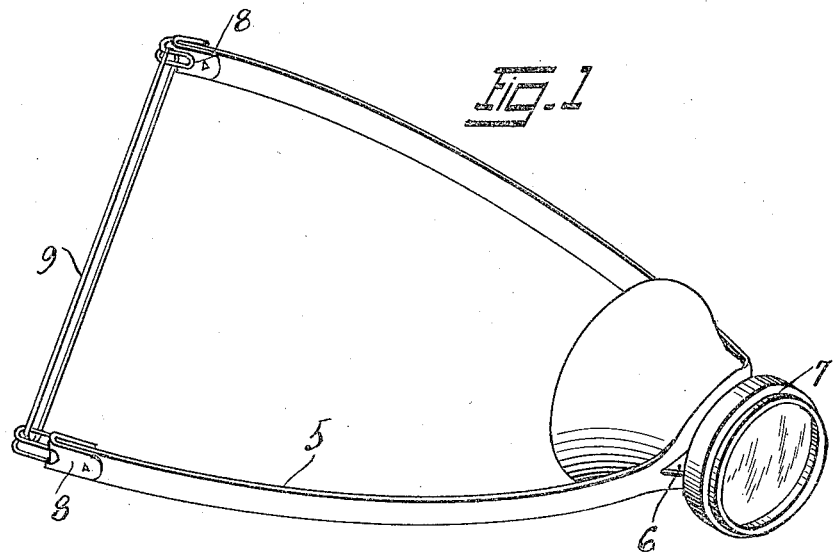
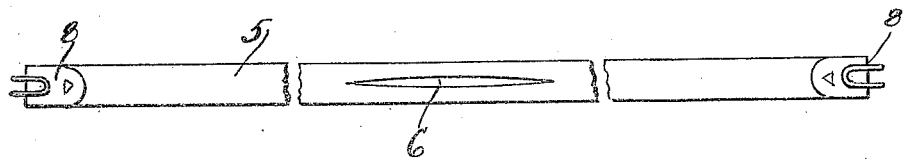
Inventor
Frank Mestre
By his Attorney Patented Sept. 20, 1932

1,878,594

UNITED STATES PATENT OFFICE

FRANK MESTRE, OF NEW YORK, N. Y.

JEWELER'S EYELOUPE HOLDER

Application filed May 21, 1930, Serial No. 454,221. Renewed July 29, 1932.

This invention relates to jeweler's eyeloupe or eyeglass holders and has for one of its objects the provision of an efficient and inexpensive holder of the character referred to adapted to fit any sized head.

Another object of the invention is to provide a strap having a centrally located slit adapted to receive a jeweler's eye glass or loupe, and means at the ends of the strap for maintaining same in place about the head of the wearer.

Other objects and novel features of my improved holder will become more apparent as the specification proceeds.

In the accompanying drawing, I have shown a preferred form of my invention, but I do not restrict myself to the exact form shown as many variations may be had without departing from the scope of the appended claims.

In the said drawing

Figure 1 is a perspective view of my improved holder with a jewelers' loupe or eyeglass therein, and Figure 2 is an extended view in elevation partly broken away of the said holder.

Referring now to the drawing in detail 5 indicates a band or strap made of any suitable material preferably leather and provided at approximately the center thereof with a slit 6 adapted to receive a jeweler's eyeglass or loupe 7.

I provide means for maintaining the said loupe and holder about the head, by securing to the ends of the said strap hook members 8 adapted to engage an elastic band 9 or other suitable means, such as for instance an elastic tape having means for engaging the hooks 8.

The foregoing arrangement provides a very efficient yet inexpensive jeweler's or watchmaker's eyeglass holder, a single size of which will fit various head sizes.

Having described my invention, what I claim as new and desire to secure by Letters Patent is:—

1. A holder of the nature described comprising a strap having an elongated incision forming an eyeglass receiving slit therein, and means in operative engagement with the said strap for maintaining same about the head.

2. In an eyeglass holder of the nature described, a strap having an elongated incision forming an eyeglass receiving slit, and bent over hook members at the ends of the said strap for the purpose specified.

3. A holder of the nature described, comprising a strap having an elongated incision forming an eyeglass receiving slit therein, bent over hook members at the ends of the said strap, and an endless elastic band adapted to engage the said hooks.

4. In combination, a strap having intermediate its ends an elongated incision forming an eyeglass receiving slit, an eyeglass therein, a bent over hook secured to the strap at each end thereof, and an endless elastic band for engaging the said hooks.

FRANK MESTRE.